United States Patent Office 3,369,847
Patented Feb. 20, 1968

3,369,847
FLUID PRESSURE BRAKE CONTROL APPARATUS
Howard I. Lee, Pittsburgh, Pa., assignor to Westinghouse Air Brake Company, Wilmerding, Pa., a corporation of Pennsylvania
Filed Apr. 15, 1966, Ser. No. 542,878
3 Claims. (Cl. 303—70)

ABSTRACT OF THE DISCLOSURE

A brake cylinder pressure release valve device, for interposition in a communication between a brake control valve device and a brake cylinder, the operation of which under manual control, while a brake application is in effect due to reduction of the pressure in the brake pipe from a normal charged value, effects release of fluid under pressure from the brake cylinder to atmosphere and simultaneously effects reduction of the pressure in the auxiliary reservoir to a chosen value less than the minimum normal charged pressure in the brake pipe, to assure restoration of the brake control valve device to its brake release position upon recharging of the brake pipe to a pressure at least equal to the minimum normal charged pressure.

---

Figure 1:
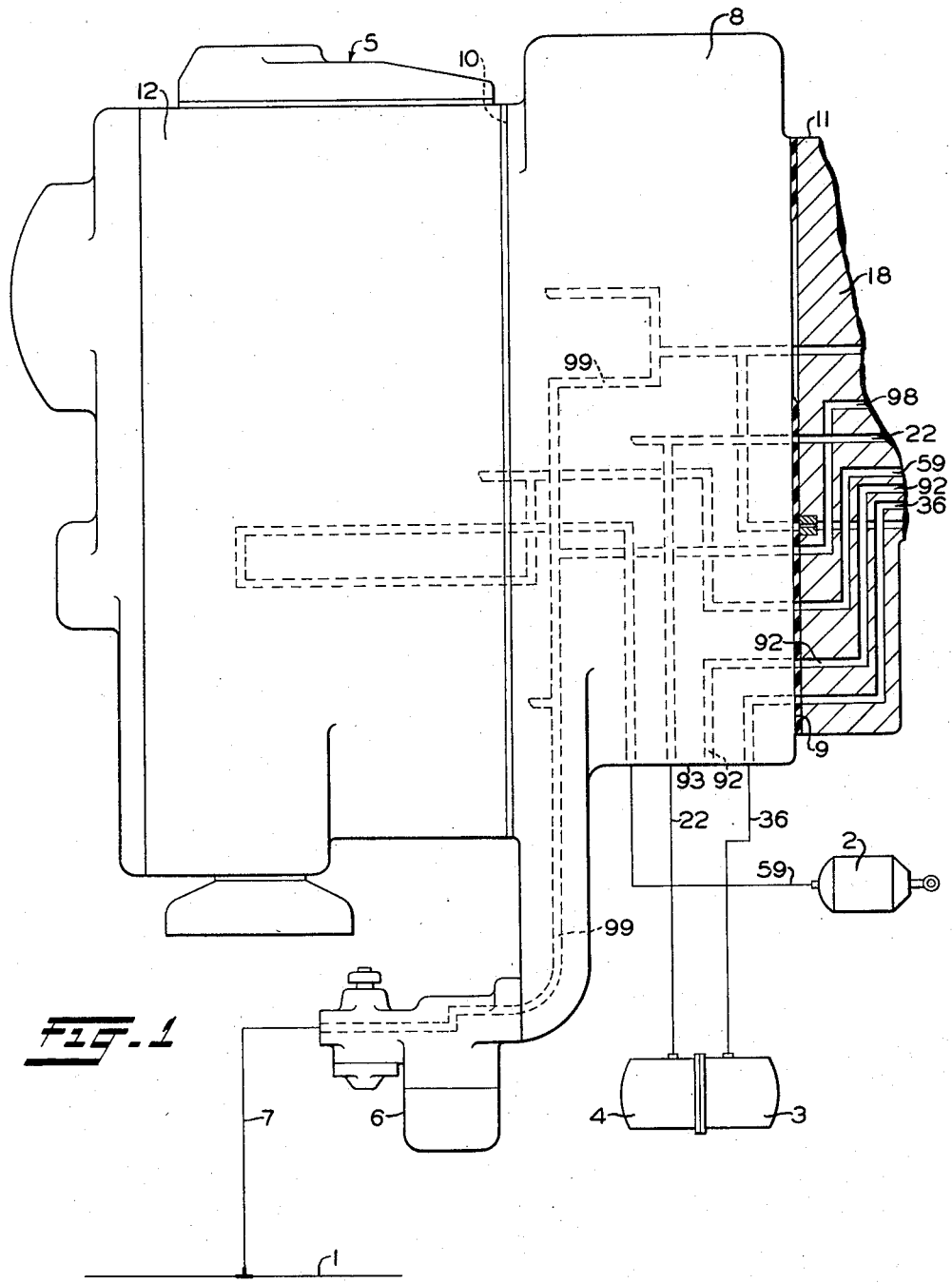

A railway car, subsequent to being hauled in one train, such as a passenger train, may be hauled in a second train, such as a freight train, having a normal charged brake pipe pressure which is substantially less than the normal charged brake pipe pressure of the first train, and also substantially less than the equalization pressure obtained between the auxiliary reservoir and the brake cylinder device on the car resulting from the emergency brake application effected at the time the car was cut out of the first train and set off on a side track. Therefore, when the car is coupled into the second train, the service slide valve cannot be shifted to brake release position out of its service application position since the brake pipe pressure of the second train and acting on one side of the operating piston for the service slide valve is less than the equalized auxiliary reservoir pressure acting on the opposite side of the piston.

Accordingly, before the service slide valve can be shifted to its release position, a trainman must blow down or reduce the auxiliary reservoir pressure to a value substantially equal to or slightly less than the normal charged brake pipe pressure of the second train by manually operating the auxiliary reservoir release valve device on this car. Since the trainman must manually maintain or hold the auxiliary reservoir release valve open until the pressure in the auxiliary reservoir is reduced to the desired value, it is apparent that this is time consuming and therefore expensive for the railroad concerned.

Accordingly, it is the general purpose of this invention to provide a novel, simple and inexpensive brake cylinder pressure release valve device for a brake control valve device which brake cylinder pressure release valve device, when operated under manual control to release fluid under pressure from a brake cylinder device to atmosphere to cause a release of the brakes on the vehicle provided with the brake control valve device, is effective to always simultaneously release fluid under pressure from the auxiliary reservoir to atmosphere until the pressure in the auxiliary reservoir is reduced to a chosen value which is less than the minimum normal charged brake pipe pressure used in the brake equipments provided on the railway vehicles operated by the American railroads, thereby insuring and guaranteeing that the service slide valve of the brake control valve device will always be returned from its service position to its release position whenever the vehicle is coupled into a train having a charged brake pipe regardless of the normal train brake pipe pressure of this train or of the train in which the vehicle was previously hauled.

According to the present invention, a diaphragm-type brake cylinder pressure release valve device is provided with a spring-biased check valve past which fluid under pressure is vented from the auxiliary reservoir to atmosphere until the pressure in the auxiliary reservoir is reduced to a chosen value whenever a reservoir release valve device is manually operated to effect the supply of fluid under pressure from the auxiliary reservoir to a chamber at one side of a diaphragm operatively connected to a brake cylinder pressure release valve which is operated thereby to effect a complete release of fluid under pressure from a brake cylinder device to atmosphere.

Figure 2:
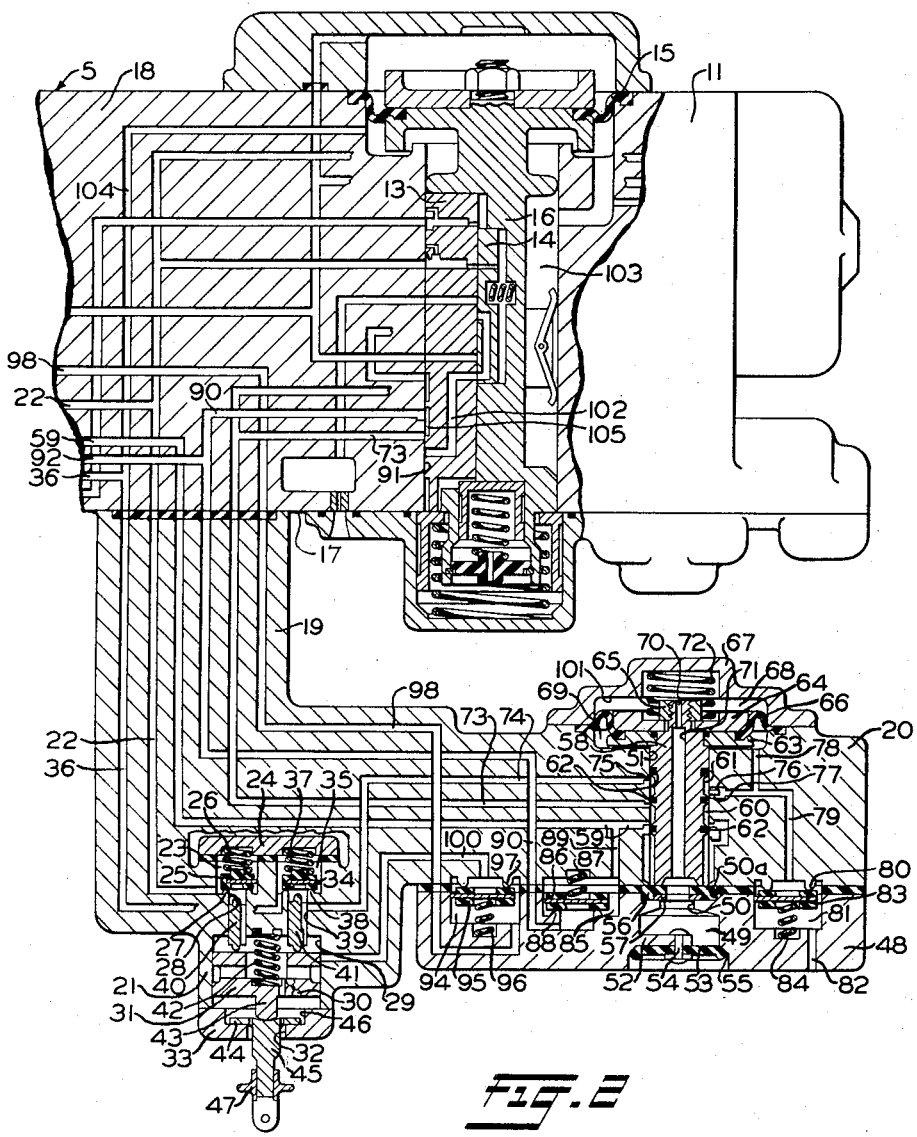

In the accompanying drawings:

FIG. 1 and FIG. 2, when taken together such that the right-hand edge of FIG. 1 is matched with the left-hand edge of FIG. 2, constitutes a diagrammatic view, mainly in section, of an improved "AB" type brake control valve device embodying the invention which comprises a novel brake cylinder pressure release valve which when manually operated by a trainman simultaneously effects a complete release of fluid under pressure from a brake cylinder device associated with the brake control valve device in a fluid pressure railway freight car brake equipment, and the venting of fluid under pressure from an auxiliary reservoir constituting a part of the brake equipment to atmosphere until the pressure in this reservoir is reduced to a chosen value.

Description

As shown in FIGS. 1 and 2 of the drawings, when the right-hand edge of FIG. 1 is placed alongside of the left-hand edge of FIG. 2, an improved freight car fluid pressure brake equipment embodying the invention comprises a brake pipe 1 that extends from one end of the car to the other, a brake cylinder device 2, an auxiliary reservoir 3, an emergency reservoir 4, and a brake control valve device 5 connected to the brake pipe 1 through a combined cut-out cock and centrifugal dirt collector 6, and a branch pipe 7.

The brake control valve device 5 may comprise a pipe bracket 8 having gasket faces 9 and 10 disposed opposite each other, a service portion 11, and an emergency portion 12. The parts described above are standard components of the well-known AB freight car brake equipment now used on the freight cars of most American railroads except the service portion 11 has been upgraded to provide a service portion that, with the exception of the brake cylinder pressure release valve device thereof, is identical in construction and operation to the service portion 11 of the brake control valve device 5 shown and described in copending application of Francis Robert Racki, issued as Patent 3,338,641 on Aug. 29, 1967 and assigned to the assignee of the present application.

Briefly, the service portion 11 comprises a service slide valve 13 and a graduating valve 14 which are operated to their various positions by a diaphragm type piston or abutment 15 through the intermediary of a service valve operating stem 16 in the manner described in detail in the above-mentioned patent of Francis Robert Racki.

Secured to a flat surface 17 formed on the bottom of a casing section 18 of the service portion 11 by any suitable means (not shown) is a casing section 19 of a sectionalized casing of a novel brake cylinder pressure release valve device 20 constituting the present invention. This brake cylinder pressure release valve device 20 includes a reservoir release valve device 21.

As shown in the drawings, a pipe 22 and a correspondingly numbered passageway extending through the pipe bracket 8 and casing sections 18 and 19 connects the emergency reservoir 4 to a first chamber 23 in the reservoir release valve device 21 which chamber 23 is formed by the cooperative relationship of the casing section 19 and a cover member 24 between which is disposed a resilient sealing gasket.

Disposed in the chamber 23 is a first disc-type check valve 25 between which and the cover member 24 is interposed a spring 26 which is normally effective to bias this check valve into seated contact with an annular valve seat 27 formed at the upper end of a bore 28 in the casing section 19. Consequently, while the check valve 25 is biased against the valve seat 27 by the spring 26, fluid under pressure present in the chamber 23 and the emergency reservoir 4 connected thereto cannot flow to atmosphere via the bore 28, a coaxial counterbore 29, a choke 30 formed in a follower 31 that is slidably mounted in the counterbore 29, and a bore 32 formed in a bottom cover member 33 that closes the lower end of the counterbore 29 and is secured to the casing section 19 by any suitable means (not shown).

The reservoir release valve device 21 further comprises a second disc-type check valve 34 disposed in a second chamber 35 formed by the cooperative relationship of the casing section 19 and the cover member 24 into which chamber opens one end of a passageway 36 that extends through the casing sections 19 and 18 and the pipe bracket 8 and is connected by a pipe bearing the same numeral to the auxiliary reservoir 3 (FIG. 1).

Disposed in the chamber 35 and interposed between the disc-type check valve 34 and the cover member 24 is a spring 37 which is normally effective to bias this check valve into seating contact with an annular valve seat 38 formed at the upper end of a bore 39 in the casing section 19 the axis of which bore 39 is arranged in parallel spaced-apart relation to the axis of the hereinbefore-mentioned bore 28.

A pair of actuating stems or rods 40 and 41 are respectively slidably mounted in the bores 28 and 39 for effecting unseating of the respective flat disc-type check valves 25 and 34 against the yielding resistance of the corresponding springs 26 and 37. The lower end of the actuating rods 40 and 41 are supported on the upper side of the follower 31 between which and the casing section 19 is interposed a spring 42 which is effective to bias a stem 43 integral with the follower 31 against a head or flange 44 of a universally tiltable actuator 45 which head 44, as shown in FIG. 2, is normally seated on an internal flange formed by the bottom of a counterbore 46 that is coaxial with the bore 32 in the bottom cover member 33. The lower end of the actuator 45 is in the form of a stem which is press-fitted into a bore formed in a clevis 47 to the jaws of which may be pivotally connected an actuating rod (not shown).

The sectionalized casing of the hereinbefore-mentioned brake cylinder pressure release valve device 20 includes a second casing section 48 in which is provided a chamber 49 into which opens one end of a bore 50 the opposite end of which opens into one end of a coaxial counterbore 50a that in turn is coaxial with a bore 51 formed in the casing section 19. Casing section 48 has formed integral therewith a horizontally disposed arm 52 to which a dished circular shield 53 formed of some suitable resilient material, such as rubber, is secured by a centrally disposed rivet 54 that extends through coaxial bores in the shield 53 and arm 52. The circumferential surface of the shield 53 is adapted to contact a substantially conical inner surface 55 formed on the bottom of the second casing section 48 for preventing access to the chamber 49 of particles of foreign matter or by nest-building insects, such as mud wasps. A plurality of notches or grooves are formed in the outer edges of the shield 53 for preventing sealing contact thereof with the inner surface 55. It will be noted that the surface 55 formed on the second casing section 48 extends somewhat beyond the rubber shield 53 so as to provide an adequate protection against the formation of ice over the opening in the lower side of the second casing section 48, and that the shield 53 has sufficient area and flexibility to insure its displacement under the pressure of fluid in the chamber 49 to eject any foreign matter that might reach this chamber.

Disposed in the counterbore 50a in the casing section 48, is a resilient annular valve seat member 56 which may be constructed of, for example, rubber or some other suitable material and which has embedded therein a metallic ring 57. Slidably mounted in the bore 51 above the valve seat member 56 is a two-position spool-type brake cylinder release valve 58, the lower end of which is dished to provide a short sleeve-like portion which, while the release valve 58 occupies the position shown in FIG. 2 of the drawings, forms a seal with the valve seat member 56 to prevent flow of fluid under pressure from a passageway 59, formed in the casing section 19 and opening at one end at the wall surface of the bore 51 above the annular valve seat member, to the chamber 49.

The passageway 59 extends through the casing sections 19 and 18, as shown in the drawings, and through the pipe bracket 8 and the emergency portion 12 in a conventional manner, and is connected by a pipe bearing the same numeral to the brake cylinder device 2.

Referring again to FIG. 2 of the drawings, it will be noted that the spool-type brake cylinder release valve 58 is provided with two spaced-apart elongated peripheral annular grooves 60 and 61 and with three peripheral annular grooves, one between the elongated peripheral annular grooves 60 and 61 and one adjacent the respective outer end of each of the elongated peripheral annular grooves 60 and 61, in each of which is disposed an O-ring 62 which forms a seal with the wall surface of the bore 51 to prevent leakage of fluid under pressure from either of the elongated peripheral annular grooves 60 and 61 to the other and also from the respective outer ends of these grooves along the length of the spool-type release valve 58 to the corresponding end thereof.

The upper end of the spool-type release valve 58 is provided with two portions of reduced diameter to form two spaced-apart shoulders against which rests respectively two diaphragm followers 63 and 64 which are forced toward each other by a nut 65 having screw-threaded engagement with screw threads formed on the upper end of the release valve member 58 to clamp between these diaphragm followers the inner periphery of a diaphragm 66. The outer periphery of the diaphragm 66 is clamped between the casing section 19 and a substantially cup-shaped cover member 67 that is secured to the casing section 19 by any suitable means (not shown).

Diaphragm 66 cooperates with the casing section 19 and the cover member 67 to form within the brake cylinder pressure release valve device 20 and on the respective opposite sides of the diaphragm 66, two chambers 68 and 69. The chamber 68 is opened to atmosphere via a bore 70 and a coaxial counter-bore 71 extending longitudinally through the spool-type release valve 58, the annular valve seat member 56, the bore 50, the chamber 49, and past the shield 53 which is deflected away from the conical surface 55 whenever the pressure in the chamber 49 exceeds atmospheric pressure to provide for flow of fluid under pressure from the chamber 49 to atmosphere.

Disposed in the chamber 68 and interposed between the diaphragm follower 64 and the cup-shaped cover member 67 is a spring 72 which is effective in the absence of fluid under pressure in the chamber 69 to bias the lower dished end of the brake cylinder release valve 58 against the annular valve seat member 56.

While the spool-type brake cylinder release valve 58 occupies the position in which it is shown in FIG. 2, the elongated peripheral annular groove 60 thereon is effective to establish a communication between the hereinbefore-mentioned passageway 59 and a passageway 73 which extends through the casing sections 19 and 18 and opens at the slide valve seat of the service slide valve 13. Also, while the spool-type brake cylinder release valve 58 occupies the position shown in FIG. 2, the elongated peripheral annular groove 61 thereon is effective to establish a communication between a passageway 74 formed in the casing section 19, one end of which passageway 74 opens through a restriction or choke 75 at the wall surface of the bore 51 and each of two short passageways 76 and 77 in the casing section 19. One end of each of the passageways 76 and 77 opens at the wall surface of the bore 51, these ends being arranged one vertically above the other in spaced-apart relationship. The opposite end of each of the passageways 76 and 77 opens into a passageway 78 that is connected to the chamber 69 below the diaphragm 66. Opening into the passageway 78 intermediate the ends thereof is one end of a passageway 79 the other end of which opens within an annular valve seat 80 formed on the bottom of the first casing section 19 which cooperates with the second casing section 48 to form a chamber 81 which is opened to atmosphere via a passageway 82 in the casing section 48. Disposed in the chamber 81 is a disc-type check valve 83 between which and the second casing section 48 is interposed a spring 84 which is normally effective to bias the disc-type check valve 83 into seating contact with the annular valve seat 80 to close communication between the passageway 79 and the chamber 81.

As shown in FIG. 2 of the drawings, the casing sections 19 and 48 cooperate to form a second chamber 85. Disposed in this chamber 85 is a disc-type check valve 86 between which and the casing section 19 is interposed a spring 87 which is normally effective to bias the check valve 86 into seating contact with an annular valve seat 88 to close communication between the chamber 85, which is connected by a passageway 89 in the casing section 19 to the hereinbefore-mentioned passageway 59 in this casing section, and a passageway 90 one end of which opens within the annular valve seat 88. The passageway 90 extends through the casing sections 48, 19 and 18 and opens at its other end at the surface of a slide valve seat 91 upon which rests the hereinbefore-mentioned service slide valve 13. Opening into the passageway 90 intermediate the ends thereof is one end of a passageway 92 that extends through the casing section 18 and pipe bracket 8 (FIG. 1) to atmosphere. It should be understood that if a brake cylinder pressure retaining valve device is used with the brake control valve device 5, the brake cylinder pressure retaining valve device is connected by a pipe (not shown) to that end of the passageway 92 that is open to atmosphere at a flat surface 93 formed on the bottom of the pipe bracket 8 (FIG. 1).

The casing sections 19 and 48 cooperate to form a third chamber 94 in which is disposed a disc-type check valve 95 between which and the casing section 48 is interposed a spring 96 which is normally effective to bias the check valve 95 into seating contact with an annular valve seat 97 to close communication between the chamber 94, which is connected to the brake pipe 1 via a passageway 98 extending through the casing sections 48, 19 and 18 and the pipe bracket 8, and a passageway 99 in the pipe bracket 8 to which one end of the passageway 98 is connected, the combined cut-out cock and dirt collector 6, and the branch pipe 7, and a passageway 100 formed in the casing section 19, one end of which passageway opens within the annular valve seat 97 and the opposite end of which opens at the wall surface of the hereinbefore-mentioned counter-bore 29 in the casing section 19.

Operation

Initial charging of the brake equipment shown in FIGS. 1 and 2 can be effected in the same manner as described in detail in the aforementioned Racki patent. Furthermore, when a brake application is effected, this brake equipment operates in the same manner as described for the brake equipment disclosed in the abovementioned Racki patent to supply fluid under pressure to the brake cylinder device 2. Consequently, let it be supposed that a freight car provided with the brake control valve device 5 shwon in FIGS. 1 and 2 has been cut out of a train and set off on a siding. When the freight car was set off on the siding, the fluid under pressure in the brake pipe 1 was completely depleted thereby causing the brake control valve device 5 to operate to cause an emergency brake application on the car.

Now let it be supposed that a trainman desires to manually release fluid under presure from the brake cylinder device 2 to effect a release of the brakes on the car. To do so, the trainman will momentarily exert a pull on the actuating rod that is pivotally connected to the jaws of the clevis 47 of the reservoir release valve device 21 (FIG. 2). This pull is transmitted to the lower end of the actuator 45 and is effective to tilt its head 44 upward since this head 44 normally rests on the flange formed by the bottom of the counterbore 46 in the bottom cover member 33. As the head 44 is thus tilted upward, it is effective to move the follower 31 and the stems 40 and 41 upward since the lower end of each of these stems rests on the follower 31 as can be seen from FIG. 2. The stem 41 is longer than the stem 40. Therefore, let it be assumed that the pull exerted by the trainman on the actuating rod moves the follower 31 and stems 40 and 41 upward only far enough for the stem 41 to effect unseating of the corresponding check valve 34, without the stem 40 effecting unseating of the check valve 25. Since the chamber 35 is connected to the auxiliary reservoir 3 via passageway and corresponding pipe 36, when the check valve 34 is unseated in the manner just explained, fluid under pressure flows from chamber 35 and auxiliary reservoir 3 to atmosphere via bore 39, counterbore 29, choke 30 in follower 31, counterbore 46 and bore 32 at a rate controlled by the size of the choke 30. Since the choke 30 restricts the rate of flow of fluid under pressure from the bore 39 and counterbore 29 to atmosphere, some of the fluid under pressure supplied from the auxiliary reservoir 3 and chamber 35 past the unseated check valve 34 to the interior of the bore 39 flows therefrom to the chamber 69 below the diaphragm 66 via passageway 74, choke 75, elongated peripheral annular groove 61 on the brake cylinder release valve 58, short passageways 76 and 77 in parallel, and passageway 78. As fluid under pressure is thus supplied to the chamber 69, the pressure therein increases to cause the diaphragm 66 to be deflected upward against the yielding resistance of the spring 72.

Since the diaphragm 66 is operatively connected to the brake cylinder release valve 58 by means of the diaphragm followers 63 and 64 and nut 65, the brake cylinder release valve 58 is moved upward by the upward deflection of the diaphragm 66. Consequently, when the diaphragm 66 has been deflected upward to the position in which the diaphragm follower 64 abuts a stop surface 101 formed on the cover member 67, the brake cylinder release valve 58 occupies a position in which the intermediate O-ring 62 thereon forms a seal with the wall surface of the bore 51 above the opening of the passageway 76 and below the opening of the passageway 74 at the wall surface of the bore 51. Also in this position of brake cylinder release valve 58, the lower O-ring 62 thereon forms a seal with the wall surface of the bore 51 above the opening of the passageway 59 at the wall surface of the counterbore 51 and below the opening of the passageway 73 at this wall surface so that the elongated peripheral annular groove 60 on the release valve 58 cuts off communication between passageways 59 and 73 and establishes a communication between the passageways 73 and 77 so that the fluid under pressure present in passageway 73 is supplied to the chamber 69 to maintain the release valve 58 in its upper position.

Upon movement of the brake cylinder release valve 58 to its upper position described above, the lower end thereof is moved upward and away from the annular valve seat 56 whereupon fluid under pressure will be completely released from the brake cylinder device 2 to atmosphere via pipe and corresponding passageway 59, bore 51, past valve seat 56, bore 50, chamber 49 and past shield 53 which is deflected away from inner conical surface 55 by fluid under pressure in the chamber 49. This complete release of fluid under pressure from the brake cylinder device 2 releases the emergency brake application previously effected on the car at the time it was cut out of a train and set off on a side track.

Also upon movement of the brake cylinder release valve 58 to its upper position, fluid under pressure will be supplied from the auxiliary reservoir 3 to the chamber 69 below the diaphragm 66, in a manner hereinafter explained in detail, to cause the brake cylinder release valve 58 to be maintained in its upper position until the service slide valve 13 and graduating valve 14 are returned to their release position.

Furthermore, the pressure in the auxiliary reservoir 3 will at this time be reduced to a chosen pressure dependent on the value of the spring 84, which for example, may be such as to retain a pressure of sixty pounds per square inch in the auxiliary reservoir 3.

As explained in detail in the above-mentioned Racki patent, when a brake application (either service or emergency) is effected, the service slide valve 13 and the graduating valve 14 are moved to a service position in which the right-hand end of a passageway 102 in the service slide valve 13 is uncovered by the graduating valve 14, and the left-hand end of this passageway 102 registers with the port and corresponding passageway 73. Since the auxiliary reservoir 3 is connected to a service slide valve chamber 103 in which the service slide valve 13 and graduating valve 14 are disposed via the pipe and corresponding passageway 36 and a passageway 104 in the casing section 18 one end of which passageway is connected to the passageway 36 and the opposite end of which opens into the slide valve chamber 103, it will be understood that when the brake cylinder release valve 58 is moved to its upper position in the manner described above, fluid under pressure will flow from the auxiliary reservoir 3 to the chamber 69 below the diaphragm 66 via pipe and corresponding passageway 36, passageway 104, service slide valve chamber 103, passageway 102 in the service slide valve 13, passageway 73, elongated peripheral annular groove 60 on the brake cylinder release valve 58 which is now in its upper position, passageways 76 and 77 in parallel, and passageway 78. The fluid under pressure thus supplied to the chamber 69 below the diaphragm 66 serves to maintain this diaphragm and the release valve 58 in their upper position, as hereinbefore-mentioned, subsequent to the trainman releasing the actuating rod connected to the clevis 47 the releasing of which rod renders spring 37 effective to seat the check valve 34 on the valve seat 38 to cut off flow of fluid under pressure from the auxiliary reservoir 3 to the chamber 69 past the check valve 34.

It will be noted from FIG. 2 of the drawings that one end of the passageway 79 is connected to the passageway 78. Therefore, it is apparent that fluid under pressure supplied from the auxiliary reservoir 3 to the chamber 69 in the manner described above will flow therefrom via the passageways 78 and 79 to the upper side of the check valve 83 and acts on the area within the annular valve seat 80 to unseat the check valve 83 against the yielding resistance of the spring 84. When the check valve 83 is thus unseated, fluid under pressure will flow from the auxiliary reservoir 3 and chamber 69 to atmosphere via passageways 78 and 79, past unseated check valve 83, chamber 81 and passageway 82 until the pressure in the auxiliary reservoir 3 and chamber 69 is reduced to sixty pounds per square inch, it being remembered, as stated above, that the value or strength of the spring 84 is such as to seat the check valve 83 on the annular valve seat 80 when the pressure in the auxiliary reservoir 3 is reduced to a chosen value of sixty pounds per square inch.

From the foregoing, it is apparent that whenever a trainman manually operates the reservoir release valve device 21 to cause the brake cylinder release valve 58 to be moved to its upper position to effect a complete release of fluid under pressure from the brake cylinder device 2 to atmosphere and thereby a release of a brake application previously effected by operation of the brake control valve device 5, the pressure in the auxiliary reservoir 3 is simultaneously reduced to a chosen pressure, which, for example, may be sixty pounds per square inch. Therefore, regardless of the equalization pressure between the auxiliary reservoir 3 and the brake cylinder device 2 at the time the car was cut out from a train and set off on a siding, it being understood that this equalization pressure is dependent on the pressure carried in the train brake pipe of the train in which the car was hauled prior to it being set off on a siding, which brake pipe pressure in the case of a passenger train may be ninety or one hundred and ten pounds per square inch, whenever the brake application is manually released, the pressure in the auxiliary reservoir 3 is reduced to a chosen value of, for example, sixty pounds per square inch. This pressure is substantially less than a pressure of seventy pounds per square inch which is the normal charged pressure carried in the train brake pipe of a freight train. Accordingly, by always reducing the pressure in the auxiliary reservoir 3 to the chosen pressure of sixty pounds per square inch at the time of effecting a manual release of the brakes on the car subsequent to it being cut out of one train and prior to it being coupled into another train, the brake pipe pressure of which may be less than that of the first train and for example, seventy pounds per square inch, operation of the service slide valve 13 and graduating valve 14 of the service portion 11 of the brake control valve device 5 from their service position to their release position is positively assured so that the brakes on this car will be applied whenever a subsequent brake application on the second train is effected. This brake application is assured notwithstanding the fact that the normal charged pressure carried in the train brake pipe of the second train may be less than the normal charged pressure carried in the train brake pipe of the first train, it of course being understood that the normal charged pressure carried in the train brake pipe of a freight train which may be the second train, is never less that seventy pounds per square inch which is substantially higher than that of sixty pounds per square inch to which the pressure in the auxiliary reservoir 2 is always reduced when a manual release of the brakes is effected by a trainman while the car is detached from a train.

It should be noted that subsequent to the pressure in the auxiliary reservoir 3 being reduced to the chosen value of sixty pounds per square inch in the manner described above, the spring 84 will reseat the check valve 83 on the annular valve seat 80. After the check valve 83 is seated on the annular valve seat 80, the retained auxiliary reservoir pressure of sixty pounds per square inch is effective in the chamber 69 below the diaphragm 66. Consequently, the brake cylinder release valve 58 will remain in its upper position in which the brake cylinder device 2 is open to atmosphere until the car is coupled into a train and the brake pipe 1 recharged to cause a release of fluid under pressure from chamber 69 via a cavity 105 in service slide valve 13 when it returns to its release position.

*Recharge of brake equipment subsequent to an emergency application followed by a manual release of brakes*

At the time a freight car is cut out of a train and set off on a side track, the brake pipe 1 is completely vented to atmosphere thereby causing the service portion 11 of the brake control valve device 5 to move to its service position and the emergency portion 12 of this valve device 5 to move to its emergency position thereby effecting an emergency brake application on the car.

As previously explained in detail, whenever a manual release of the brakes is effected, fluid under pressure is completely vented from the brake cylinder device 1 and, regardless of the brake pipe pressure of the train in which the car was previously hauled and therefore the corresponding pressure in the auxiliary reservoir 3 at the time the car was cut out of this train, the pressure in the auxiliary reservoir 3 is simultaneously reduced to a chosen value, for example, sixty pounds per square inch, which is substantially less than the minimum train brake pipe pressure of seventy pounds per square inch used on trains operated by American railroads. Therefore, when the car is picked up from a siding and coupled into a train employing a brake pipe pressure of seventy pounds per square inch or higher, the charging of the brake pipe 1 on the car to the pressure carried in the train brake pipe will be effective, on the upper side of the diaphragm 15 and in excess of the lower auxiliary reservoir pressure of sixty pounds per square inch present in the service slide valve chamber 103 and acting on the lower side of this diaphragm, to deflect diaphragm 15 downward and thereby move the service slide valve 13 and graduating valve 14 from their service position to their release position in which they are shown in FIG. 2. When the service slide valve 13 is thus returned to its release position shown in FIG. 2, fluid under pressure will be vented from the chamber 69 below the diaphragm 66 to atmosphere via passageway 78, passageways 76 and 77 in parallel, elongated peripheral annular groove 60 on the brake cylinder release valve 58 which is in its upper position, passageway 73, the cavity 105 formed in the left-hand side of the service slide valve 13, passageways 90 and 92.

The venting of fluid under pressure from the chamber 69 to atmosphere in the manner just explained, renders the spring 72 effective to return the diaphragm 66 and brake cylinder release valve 58 from their upper position to their lower position in which they are shown in FIG. 2. In this position of the brake cylinder release valve 58 the elongated peripheral annular groove 60 thereon establishes a communication between the passageways 73 and 59. Therefore, when a brake application is subsequently effected, which causes the service slide valve 13 and graduating valve 14 to be moved to their service position, fluid under pressure will flow from the auxiliary reservoir 3 to the brake cylinder device 2 to cause an application of brakes on the car.

It may be noted that if a manual release of a brake application is effected by a trainman exerting a pull on the actuating rod secured to the clevis 47 subsequent to a partial or a full service brake application, the check valve 34 will be unseated to cause the flow of fluid under pressure from the auxiliary reservoir 3 to the chamber 69 to cause the brake cylinder release valve 58 to be moved to its upper position in the manner hereinbefore described to cause a complete release of fluid under pressure from the brake cylinder device 2. This flow of fluid under pressure from the auxiliary reservoir 3 will cause a corresponding reduction in pressure in the service slide valve chamber 103 which is sufficient to render the higher brake pipe pressure acting on the upper side of the diaphragm 15 effective to return the service slide valve 13 and graduating valve 14 from their service lap position to their release position in which they are shown in FIG. 2. Assuming the car is provided with a brake cylinder pressure retaining valve device the handle of which is in a pressure retaining position, fluid under pressure will now flow from chamber 69 below diaphragm 66 to atmosphere via passageway 78, passageways 76 and 77 in parallel, elongated peripheral annular groove 60 on the brake cylinder release valve 58 which is now in its upper position, passageway 73, cavity 105, passageway 90, past check valve 86, chamber 85, passageways 89 and 59, bore 51, past valve seat member 56, bore 50, chamber 49, and past shield 53 which is deflected away from inner conical surface 55 whenever the pressure in chamber 49 exceeds atmospheric pressure. Upon release of fluid under pressure from the chamber 69 in the manner just explained, the spring 72 will return the diaphragm 66 and the brake cylinder release valve 58 to the position shown in FIG. 2. Therefore, fluid under pressure will be supplied to the brake cylinder device 2 when a subsequent brake application is effected.

It may be further noted that when the reservoir release valve 21 is manually operated in the manner hereinbefore described in detail, some of the fluid under pressure which flows past the check valve 34, when this valve is unseated, flows to the passageway 100. Fluid under pressure thus supplied to the passageway 100 is effective to unseat the check valve 95 against the yielding resistance of the spring 95 and flow to the chamber 94 and passageway 98. Fluid under pressure thus supplied to the passageway 98 flows to the emergency portion 12 to move the emergency piston and emergency slide valve (not shown) from their emergency position to their release position. The purpose of moving the emergency slide valve from its emergency position to its release position at this time is to cut off the emergency reservoir 4 from the brake cylinder device 2 so that the fluid under pressure in the emergency reservoir 4 will not be depleted when fluid under pressure is vented from the brake cylinder device 2 to atmosphere in response to the diaphragm 66 moving the brake cylinder release valve 58 to its upper position to effect the complete release of the fluid under pressure from the brake cylinder device.

Having now described the invention, what I claim as new and desire to secure by Letters Patent is:

1. In a fluid pressure brake equipment having a brake pipe normally charged with fluid under pressure, a reservoir charged with fluid under pressure, a brake cylinder device, and a fluid pressure brake control valve device operatively responsively to a reduction of the pressure in the brake pipe to effect the supply of fluid under pressure from the reservoir to the brake cylinder device to cause a brake application, and responsively to an increase of the pressure in the brake pipe to effect the release of fluid under pressure from the brake cylinder device to cause a release of a brake application, the combination of:

(a) a brake release valve means operative between a first position and a second position, (b) means biasing said brake release valve means to said first position, (c) fluid pressure operative means for effecting movement of said brake release valve means from said first position to said second position against the yielding resistance of said biasing means, (d) said brake release valve means in its said second position establishing a first exhaust communication between the brake cylinder device and atmosphere, and a second exhaust communication between the reservoir and atmosphere, (e) a spring-biased check valve device in said second exhaust communication past which fluid under pressure flows from the reservoir to atmosphere until the pressure in the reservoir is reduced to a certain chosen pressure, and (f) means for effecting the supply of fluid under pressure from the reservoir to said fluid pressure operative means to cause movement of said brake release valve means from its said first position to its said second position.

2. A fluid pressure brake equipment, as claimed in claim 1, further characterized in that said means for effecting the supply of fluid under pressure from the reservoir to said fluid pressure operative means is a manually operative valve means.

3. In a fluid pressure brake equipment having a brake pipe normally charged with fluid under pressure, a reservoir charged with fluid under pressure, a brake cylinder device, and a fluid pressure brake control valve device operative responsively to a reduction of the pressure in the brake pipe to effect the supply of fluid under pressure from the reservoir to the brake cylinder device to cause a brake application, and responsively to an increase of the pressure in the brake pipe to effect the release of fluid under pressure from the brake cylinder device to cause a release of a brake application, the combination of:

(a) a brake release valve means operative between a first position and a second position, (b) means biasing said brake release valve means to said first position, (c) fluid pressure operative means for effecting movement of said brake release valve means from said first position to said second position against the yielding resistance of said biasing means, (d) said brake release valve means while in its said first position establishing a first communication through which fluid under pressure may be supplied from said reservoir to the brake cylinder device via said brake control valve device while in its brake application position, and a second communication via which fluid under pressure may be supplied to one side of said fluid pressure operative means to cause movement of said brake release valve means from its said first position to its said second position, (e) said brake release valve means while in its said second position being effective to cut off said first communication, establish a third communication via which fluid under pressure is vented from the brake cylinder device to atmosphere, establish a fourth communication between said reservoir and said one side of said fluid pressure operative means via said brake control valve device while it is in its brake application position whereby said fluid pressure operative means maintains said brake release valve means in its said second position as long as said brake control valve device remains in its brake application position, and establishes an exhaust communication from the said reservoir to atmosphere, and (f) a spring-biased check valve device in said exhaust communication past which fluid under pressure flows from the reservoir to atmosphere while said brake control valve device is in its application position and said brake release valve means is in its second position until the pressure in the reservoir is reduced to a chosen pressure.

References Cited

UNITED STATES PATENTS 3,177,043   4/1965   Billeter _____ 303—69

EUGENE G. BOTZ, *Primary Examiner.*